US010427793B2

(12) United States Patent
Oleson et al.

(10) Patent No.: US 10,427,793 B2
(45) Date of Patent: Oct. 1, 2019

(54) SLOUCHING DIVAN WITH DAMPED MOTION

(71) Applicant: Rockwell Collins, Inc., Cedar Rapids, IA (US)

(72) Inventors: Michael L. Oleson, Parkland, FL (US); Arjun Koustubhan, Hyderabad (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/950,079

(22) Filed: Apr. 10, 2018

(65) Prior Publication Data

US 2019/0127070 A1    May 2, 2019

Related U.S. Application Data

(60) Provisional application No. 62/580,925, filed on Nov. 2, 2017.

(51) Int. Cl.
*B60N 2/34*    (2006.01)
*B64D 11/06*    (2006.01)

(52) U.S. Cl.
CPC ........ *B64D 11/0619* (2014.12); *B64D 11/064* (2014.12); *B64D 11/0621* (2014.12);
(Continued)

(58) Field of Classification Search
CPC ............ B64D 11/0619; B64D 11/0621; B64D 11/0696
(Continued)

(56) References Cited

U.S. PATENT DOCUMENTS 3,572,829 A * 3/1971 Malitte .................. B64D 11/06
                                                                297/317
4,842,333 A * 6/1989 Meiller .................. A47C 1/032
                                                                297/318
(Continued)

FOREIGN PATENT DOCUMENTS

EP          0869060 A1    10/1998
EP          1612094 A1    1/2006
(Continued)

*Primary Examiner* — Rodney B White
(74) *Attorney, Agent, or Firm* — Angel N. Gerdzhikov; Donna P. Suchy; Daniel M. Barbieri

(57) ABSTRACT

A slouching aircraft divan transitions between discrete upright, slouched, and berthed configurations. The divan has a seatpan including rollers which travel along roller slots in frame rails connecting the front and rear legs: from the upright configuration, the seatpan tracks forward and down to a midpoint corresponding to the slouched configuration and then forward and up to the berthed configuration. The back follower panel tracks with the seatpan along backrest slots, curving rearward as it tracks down to allow the back follower panel to track maximally forward, and the seatpan and backrest cushions to berth flat and parallel to the floor. The divan uses one-way damping devices to regulate the speed with which the seatpan tracks forward and down from the upright configuration to the slouched configuration and to provide a cushion when the seatpan tracking ends at the midpoint of the roller slot, when the slouched configuration is achieved.

20 Claims, 12 Drawing Sheets

(52) U.S. Cl.
CPC ...... *B64D 11/0641* (2014.12); *B64D 11/0696* (2013.01); *B64D 11/062* (2014.12)

(58) Field of Classification Search
USPC ....... 297/118, 317, 318, 322, 341, 342, 343, 297/354.13
See application file for complete search history.

(56) References Cited

U.S. PATENT DOCUMENTS

| | | | | |
|---|---|---|---|---|
| 5,261,725 A * | 11/1993 | Rudolph | ................. | A47C 9/02 297/354.13 |
| 5,722,726 A * | 3/1998 | Matsumiya | ............ | B60N 2/242 297/322 |
| 5,857,745 A * | 1/1999 | Matsumiya | .............. | B60N 2/34 297/354.13 |
| 5,992,798 A * | 11/1999 | Ferry | ................... | A47C 1/0352 297/354.13 X |
| 6,022,076 A * | 2/2000 | Samson | ............... | A47C 3/0255 297/317 X |
| 6,059,364 A * | 5/2000 | Dryburgh | ............. | A47C 1/0352 297/354.13 |
| 6,247,753 B1 * | 6/2001 | Alvestad | ................ | A47C 20/08 297/317 X |
| 6,305,644 B1 * | 10/2001 | Beroth | ................... | B64D 11/00 297/354.13 X |
| 6,352,309 B1 * | 3/2002 | Beroth | ................... | B64D 11/06 297/354.13 |
| 6,494,536 B2 * | 12/2002 | Plant | .................... | A47C 1/0352 297/318 X |
| 6,641,214 B2 * | 11/2003 | Veneruso | ............. | B60N 2/0232 297/317 X |
| 6,692,069 B2 * | 2/2004 | Beroth | ................... | A47C 1/0352 297/118 X |
| 6,742,840 B2 * | 6/2004 | Bentley | .................... | B60N 2/22 297/317 X |
| 6,929,320 B2 * | 8/2005 | Laurent | .................... | B60N 2/22 297/342 X |
| 7,472,957 B2 * | 1/2009 | Ferry | .................... | B60N 2/206 297/343 |
| 7,523,888 B2 * | 4/2009 | Ferry | .................... | B60N 2/206 297/354.13 X |
| 8,113,573 B2 * | 2/2012 | Lawson | ................. | B64D 11/06 297/118 |
| 8,303,036 B2 * | 11/2012 | Hankinson | ............. | B64D 11/06 297/317 |
| 8,376,458 B2 * | 2/2013 | Meister | .................. | B64D 11/06 297/318 |
| 8,403,415 B2 * | 3/2013 | Lawson | ................. | B64D 11/06 297/318 |
| 8,419,123 B2 * | 4/2013 | Hankinson | ............. | B64D 11/06 297/118 |
| 8,439,435 B2 * | 5/2013 | Gaither | .................. | B60N 2/242 297/118 |
| 8,579,375 B2 * | 11/2013 | Marais | .................. | B64D 11/06 297/341 |
| 8,899,674 B2 * | 12/2014 | Yagi | ...................... | A47C 1/035 297/343 |
| 2001/0000639 A1 * | 5/2001 | Park | ...................... | A47C 1/0352 297/342 X |
| 2003/0080597 A1 | 5/2003 | Beroth et al. | | |
| 2004/0036336 A1 * | 2/2004 | Veneruso | ............. | B60N 2/0232 297/354.13 |
| 2004/0080201 A1 * | 4/2004 | Verny | .................... | B64D 11/06 297/354.13 |
| 2007/0262625 A1 | 11/2007 | Dryburgh et al. | | |
| 2012/0139302 A1 | 6/2012 | Estevenin et al. | | |
| 2014/0210235 A1 * | 7/2014 | Ferry | .................... | B60N 2/206 297/118 |
| 2014/0246886 A1 | 9/2014 | Savard et al. | | |
| 2015/0284087 A1 * | 10/2015 | Henshaw | .............. | B64D 11/064 297/318 |
| 2016/0325838 A1 | 11/2016 | Erhel | | |
| 2017/0021930 A1 | 1/2017 | Henshaw | | |

FOREIGN PATENT DOCUMENTS

| | | |
|---|---|---|
| GB | 2433433 A | 6/2007 |
| GB | 2530554 A | 3/2016 |
| WO | 0048862 A1 | 8/2000 |
| WO | 2013012890 A1 | 1/2013 |

\* cited by examiner

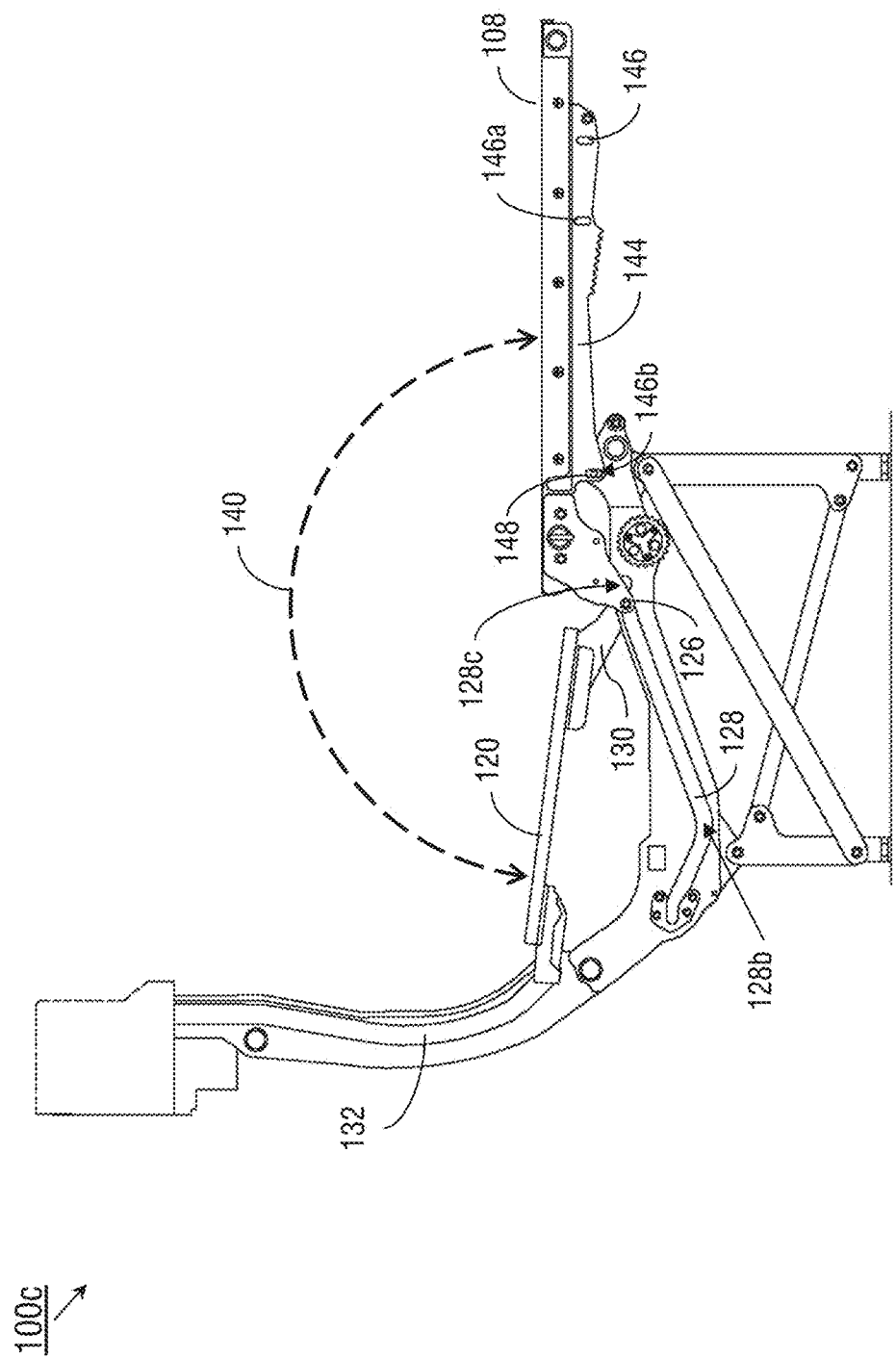

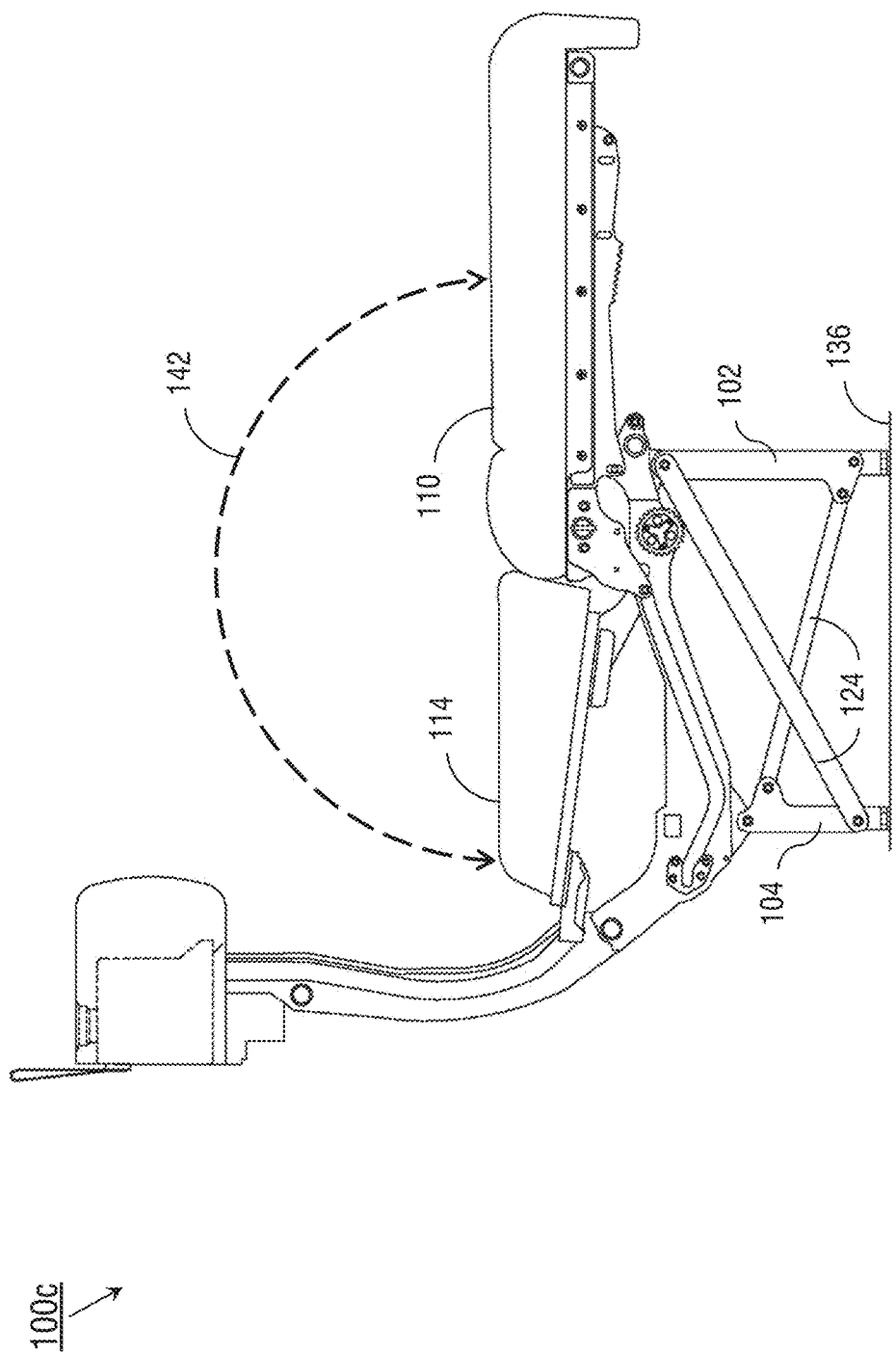

SLOUCHING DIVAN WITH DAMPED MOTION

CROSS-REFERENCE TO RELATED APPLICATIONS

The instant application claims priority under 35 U.S.C. § 119(e) to provisional U.S. Patent Application Ser. No. 62/580,925, filed Nov. 2, 2017. Said provisional U.S. Patent Application 62/580,925 is herein incorporated by reference in its entirety.

BACKGROUND

Modern business and executive aircraft may incorporate, in addition to or instead of conventional forward-facing single-passenger seating associated with commercial aircraft, convertible seating configurations able to be reconfigured to allow the occupying passengers to sleep in a prone or near-prone position while inflight. For example, divans (e.g., sofas, couches, settees) may accommodate one or more passengers in a forward-facing, aft-facing, or inboard-facing orientation. Such an aircraft divan may be configured for compliance with any applicable seating regulations, e.g., equipped with seatbelts or harnesses to restrain the occupying passengers in an upright position during taxi, takeoff, and landing (TToL) phases or flight segments. Once the aircraft is inflight and a safe cruising altitude is achieved, the passenger/s may reposition or reconfigure the divan from an upright seated position (e.g., where the seatpan of the divan is substantially parallel to the aircraft floor and the backrest of the divan is substantially perpendicular, or at a slightly obtuse angle, thereto) to a fully extended, or berthed, position wherein the seatpan and backrest of the divan are substantially coplanar with each other and substantially parallel to the aircraft floor.

An occupying passenger may additionally reposition the divan to one or more intermediate reclining or "slouching" positions between the upright position and the berthed position. For example, a slouched position may be characterized by a seatpan at a slightly acute angle to the aircraft floor (e.g., wherein the rear end of the seatpan has dropped from its upright position, the front end of the seatpan has remained in its upright position, and the angle of the backrest to the aircraft floor has slightly increased). However, for the divan to be capable of multiple, or infinite, intermediate positions between the upright and berthed positions may require complex and heavy locking and articulation equipment for securing the divan in the desired intermediate position. Further, the divan may be configured for transition from the upright to the slouched position at least partially assisted by gravity and/or the weight of the occupying passenger. As a result, the transition from the upright to the slouched position, which may involve tracking the rear end of the seatpan along a downward path, may be uncomfortably rapid for the occupying passenger; similarly, achieving the slouched position may result in an abrupt jolt for the occupying passenger.

SUMMARY

In one aspect, embodiments of the inventive concepts disclosed herein are directed to a slouching divan (e.g., couch) installable aboard an aircraft. The divan may be of single-, double-, or triple-passenger size and transitionable between three discrete configurations—upright/seated, slouched (e.g., reclined), and berthed (e.g., fully extended for sleeping)—and may regulate the transition between configurations via motion dampers. The divan may be mountable to the aircraft floor (e.g., forward-facing, aft-facing, or inboard-facing) via front and rear legs. The front and rear legs may be connected by frame rails, the frame rails including lateral slots extending from a rear end downward to a midpoint, and then up from the midpoint toward a front end. A seatpan (upon which a seatpan cushion may provide additional comfort for occupying passengers) may incorporate rollers traveling within the lateral slots. For example, when the rollers are at the rear end, midpoint, or front end respectively, the divan may be in the upright, slouched, or berthed configuration. The seatpan may include seatpan rails at the right and left sides. The divan may have a backrest also including roller slots extending from the top of the backrest down to the bottom in a path that curves to the rear. The divan may include a back follower panel (to which a backrest cushion may be attached) connected to the seatpan and connected to the backrest by rollers or bearings. For example, the back follower panel may follow the seatpan as it tracks forward along the lateral slots; the curvature in the backrest roller slots allows the back follower panel to track forward far enough that the backrest and seatpan cushions provide a flat surface (e.g., parallel to the floor) for the occupying passengers to rest upon. Because the seatpan rollers travel downward (e.g., assisted by gravity) when transitioning from the upright to the slouched configuration, the divan may incorporate one-way damping devices to regulate the speed with which the seatpan rollers track forward and downward, and the suddenness with which the rollers stop tracking when the midpoint of the lateral slots is reached and the divan achieves the slouched configuration. The damping devices are one-way in that they do not interfere with the stowing of the divan from the slouched configuration back to the upright configuration (e.g., for taxi, takeoff and landing procedures).

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 6A and 6B is a right profile view of the slouching divan of FIG. 1 in a berthed configuration;

DETAILED DESCRIPTION OF EXEMPLARY EMBODIMENTS

Figure 1:
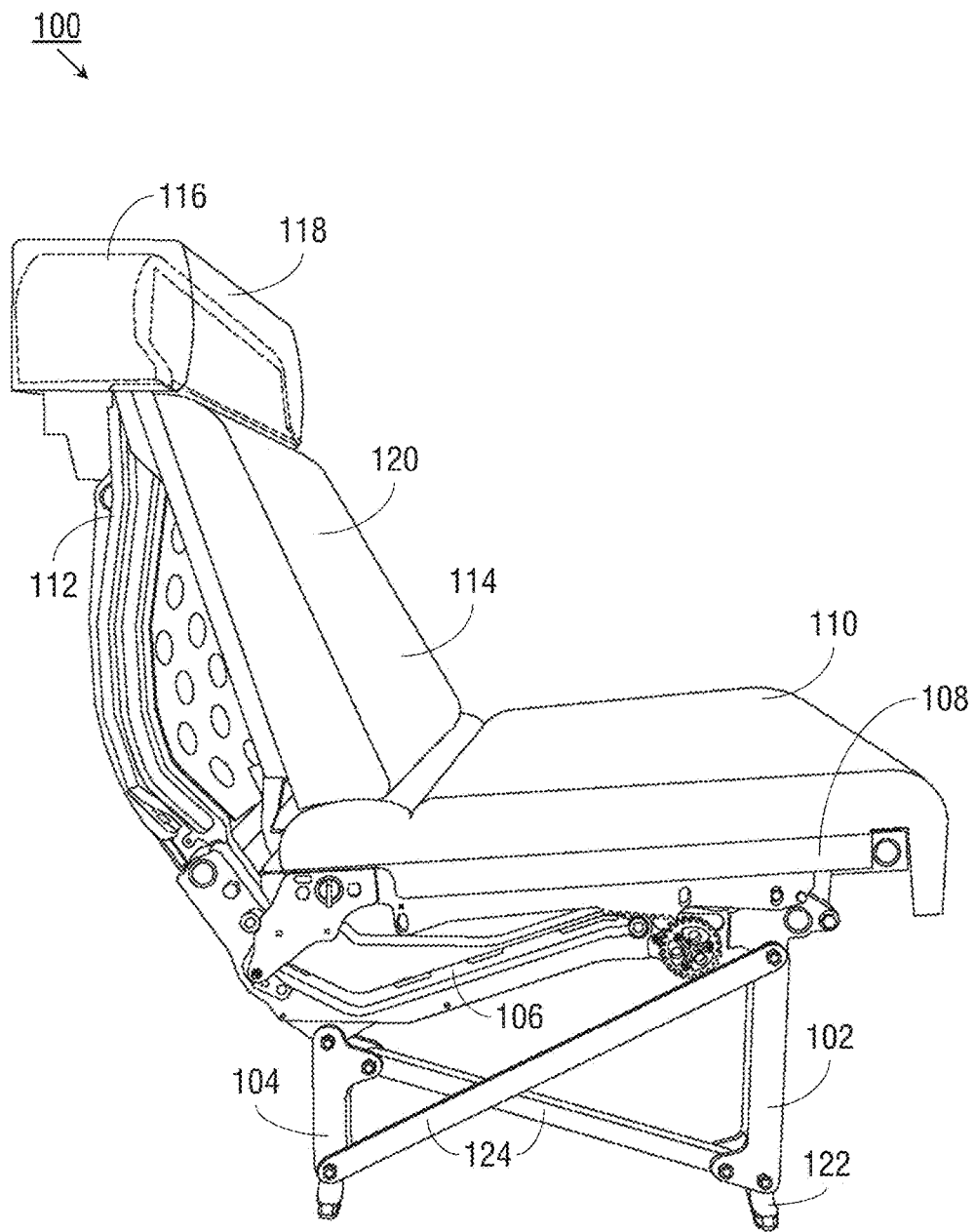
FIG. 1 is a perspective view of an exemplary embodiment of a slouching divan according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a slouching aircraft divan with damped motion. The divan is convertible by an occupying passenger between an upright seated configuration into a reclined or "slouched" configuration and a sleeping or "berthed" configuration. Damping devices prevent the transition from the seated to slouched configuration from becoming sudden or jarring without otherwise interfering with the conversion process in either direction. The divan may save weight and complexity by easily locking into one of the above three configurations as opposed to an infinite number of intermediate positions.

Referring to FIG. 1, an exemplary embodiment of a slouching divan 100 according to the inventive concepts disclosed herein may include a supporting structure including front and rear legs 102, 104, frame rails 106 supporting a seatpan 108, a seatpan cushion 110 attachable to the seatpan, a backrest 112 connected to the frame rails, a backrest cushion 114 attachable to the backrest, a headrest 116 mounted atop the backrest (at least partially covered by a removable fixed shoulder support cushion 118), and a back follower panel 120 at least partially covering the backrest. The slouching divan 100 may ordinarily include a left and right set of front and rear legs 102, 104 as well as a left and right frame rail 106. The back follower panel 120 and the seatpan 108 may be fully or partially covered by seat cushions (e.g., respectively the backrest cushion 114 and the seatpan cushion 110) to comfortably support a passenger occupying the slouching divan 100. The slouching divan 100 may be configured for single-passenger, double-passenger, or triple-passenger occupancy, e.g. simultaneous use by one, two, or three passengers; for example, the seatpan 108, backrest 112, and back follower panel 120 may be extended to twice or thrice the width of a single-passenger divan. The slouching divan 100 may be mounted to an aircraft interior, e.g., to the floor of an aircraft, by track attachment fittings 122 configured to secure the slouching divan to tracks (not shown) set into the aircraft floor; alternatively, the slouching divan 100 may be mounted directly into the floor tracks. The track attachment fittings 122 may be quick-release track fittings configured to fit into the tracks without leaving loose parts when removed from the tracks, e.g., by a single shear retainer vertically adjustable and insertable into/removable from the floor track. The slouching divan 100 may be installable within an aircraft in either a forward-facing, aft-facing, or inboard-facing configuration. Inboard-facing embodiments of the slouching divan 100 may include additional safety features to detect (e.g., via accelerometers or similar crash sensors), and protect occupying passengers from, sudden lateral impact forces associated with a crash or other rapid deceleration, e.g., a leg-flail prevention device for preventing the legs and/or lower extremities of an inboard-facing passenger (whose upper body may otherwise be protected from impact forces by armrests) from flailing forward in a crash scenario. For example, the leg-flail prevention device may be mounted to the frame rail 106 or to the front legs and rear legs 102, 104 on the left or right side, deploying forward in response to a detected inertial event. Alternatively, a front-facing or aft-facing slouching divan 100 may include a harness (e.g., a lap belt, shoulder belt, or lap/shoulder belt combination) including one or more airbags configured to rapidly deploy in response to a detected crash or impact force, providing additional protection for the occupying passenger/s. The slouching divan 100 may be further stabilized by additional cross-members 124 connecting the front legs 102 and rear legs 104 on each side of the divan; the cross-members 124 may evenly distribute the interface load throughout the divan and to the floor tracks (e.g., the shifting weight of one or more occupying passengers) when the slouching divan transitions between upright, slouched, and berthed configurations.

Figure 2A:
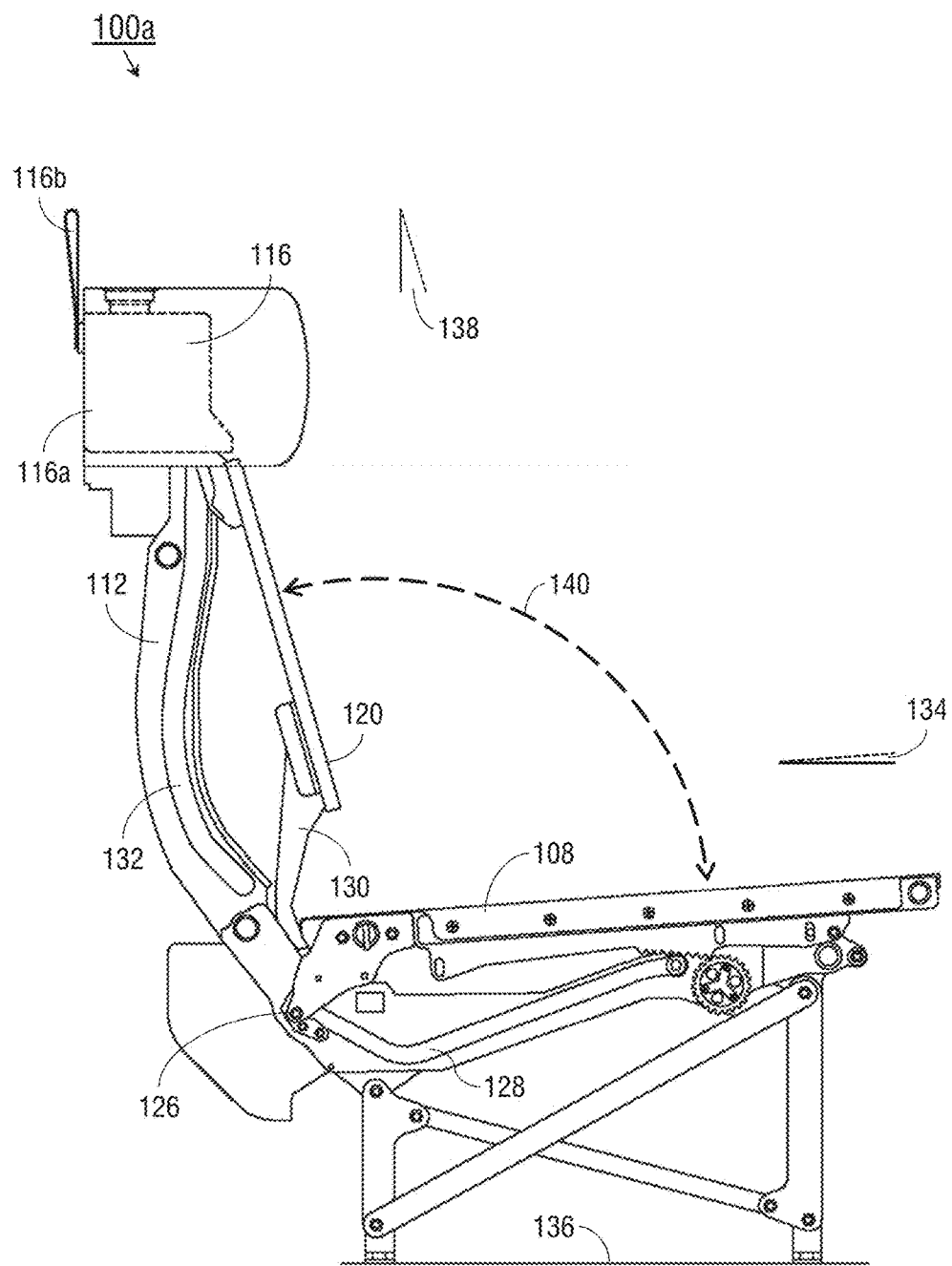
FIGS. 2A and 2B illustrate a right profile view of the slouching divan of FIG. 1 in an upright seating configuration.
Figure 2B:
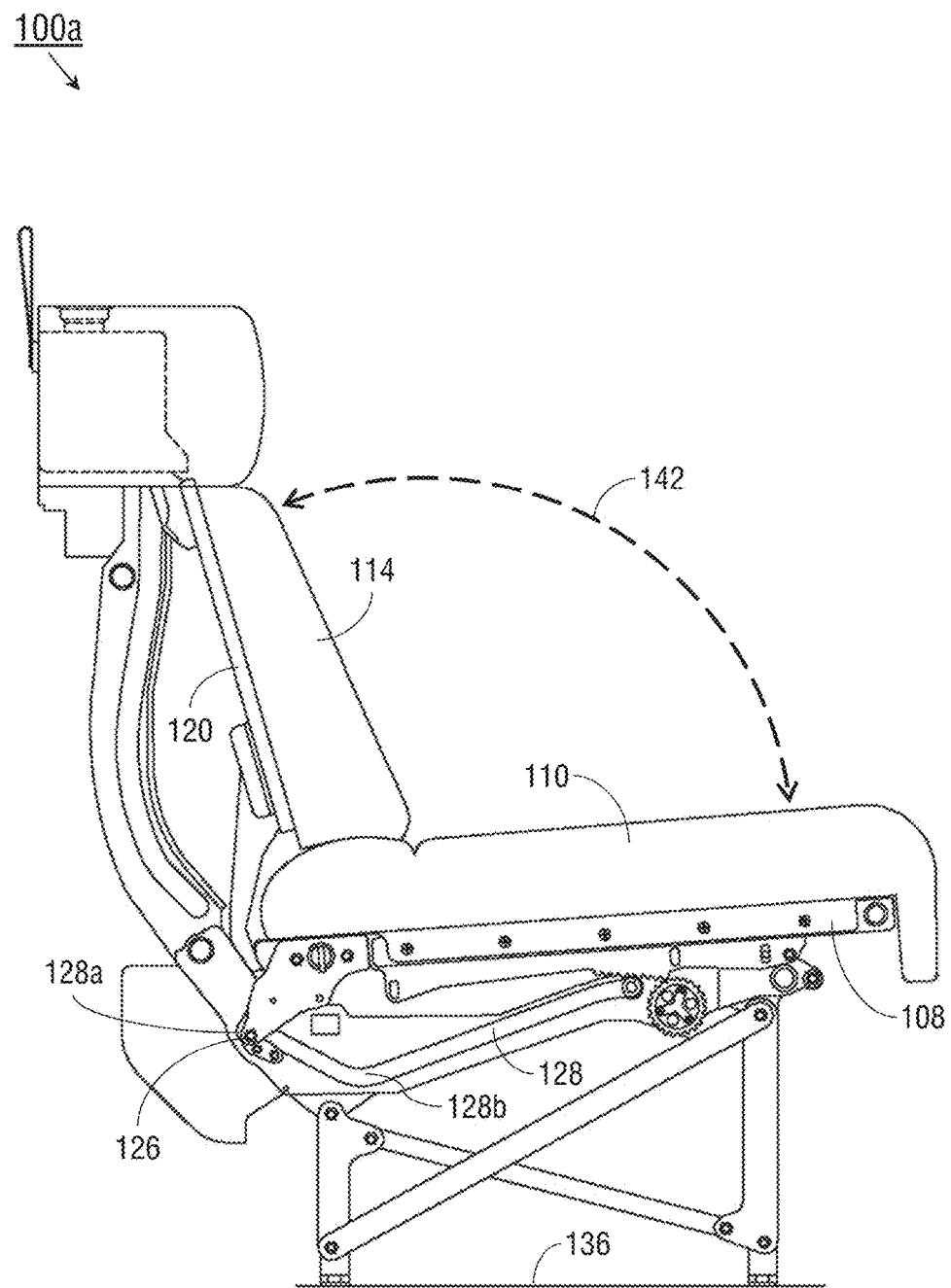

Referring now to FIGS. 2A and 2B, a slouching divan 100a may be implemented and may function similarly to the slouching divan 100 of FIG. 1, except that the slouching divan 100*a* may be positioned in an upright seating configuration. For example, the slouching divan 100*a* may remain in the upright configuration during taxi, take-off and landing (TTOL) phases or flight segments, until the aircraft within which the slouching divan 100*a* is installed reaches a safe cruising altitude. The slouching divan 100*a* may then be transitioned to a slouching or berthed configuration (see, e.g., FIGS. 3 and 4) by passengers wishing a more accommodating resting or sleeping position, and re-stowed to the upright configuration upon initial descent. The slouching divan 100*a* may include shoulder harnesses (116*a*) as described above, stowed within the headrests 116 and accessible (e.g., rotatable to a vertical position) via handles 116*b*.

The seatpan 108 may be connected to the frame rails 106 by roller bearings 126 (or any similarly appropriate tracking members) disposed within lateral roller slots (128) machined into the frame rails. Alternatively, the lateral roller slots 128 may be incorporated (e.g., machined or set) into separate attachable components which may be mounted to the frame rails 106. The lateral roller slots 128 may track substantially forward (e.g., the direction in which the slouching divan 100*a* is oriented) towards the front end of the seatpan 108. For example, if an occupying passenger wishes to transition the slouching divan 100*a* into the slouched or berthed configuration, the passenger may do so by articulating the seatpan 108 forward and the forward motion of the seatpan will be regulated by the lateral roller slots 128. The seatpan 108 may be coupled to the back follower panel 120 by a set of J-connectors 130 (or any appropriate linking members) such that forward motion of the seatpan 108 is transmitted to the back follower panel 120, which may follow the motion of the seatpan along a counterpart set of backrest roller slots (132) machined into the backrest 110. The backrest roller slots 132 may curve rearward, such that the distance traveled by the back follower panel 120 in its substantially downward path is slightly increased and the depth achievable by the slouching divan 100*a* in the berthing configuration (see, e.g., FIGS. 6A/B) is accordingly greater than would be the case with a straight-beam backrest.

The back follower panel 120 and seatpan 108 of the slouching divan 100*a* may be aligned so that in the upright configuration, the seatpan angle (134; e.g., the angle of the seatpan to the aircraft floor (136), or to the horizontal) is between three and eight degrees, e.g., 4.73 degrees as shown by FIG. 2A. Similarly, the backrest angle (138; e.g., the angle of the back follower panel 120 to the vertical) may be between 13 and 18 degrees (e.g., 16.1 degrees, as shown by FIG. 2A). Accordingly, the included angle 140, or the angle between the seatpan 108 and the back follower panel 120, may be between 95 and 105 degrees (e.g., 101.37 degrees, as shown by FIG. 2A).

Referring in particular to FIG. 2B, the slouching divan 100*a* may include a seatpan cushion 110 of a substantially uniform thickness, such that when the seatpan cushion and the backrest cushion 114 are attached to the seatpan 108 and back follower panel 120 respectively, the cushion angle (142; e.g., the angle between the seatpan cushion 110 and the backrest cushion 114) is between 104 and 114 degrees (e.g., 108.92 degrees as shown by FIG. 2B).

Figure 3:
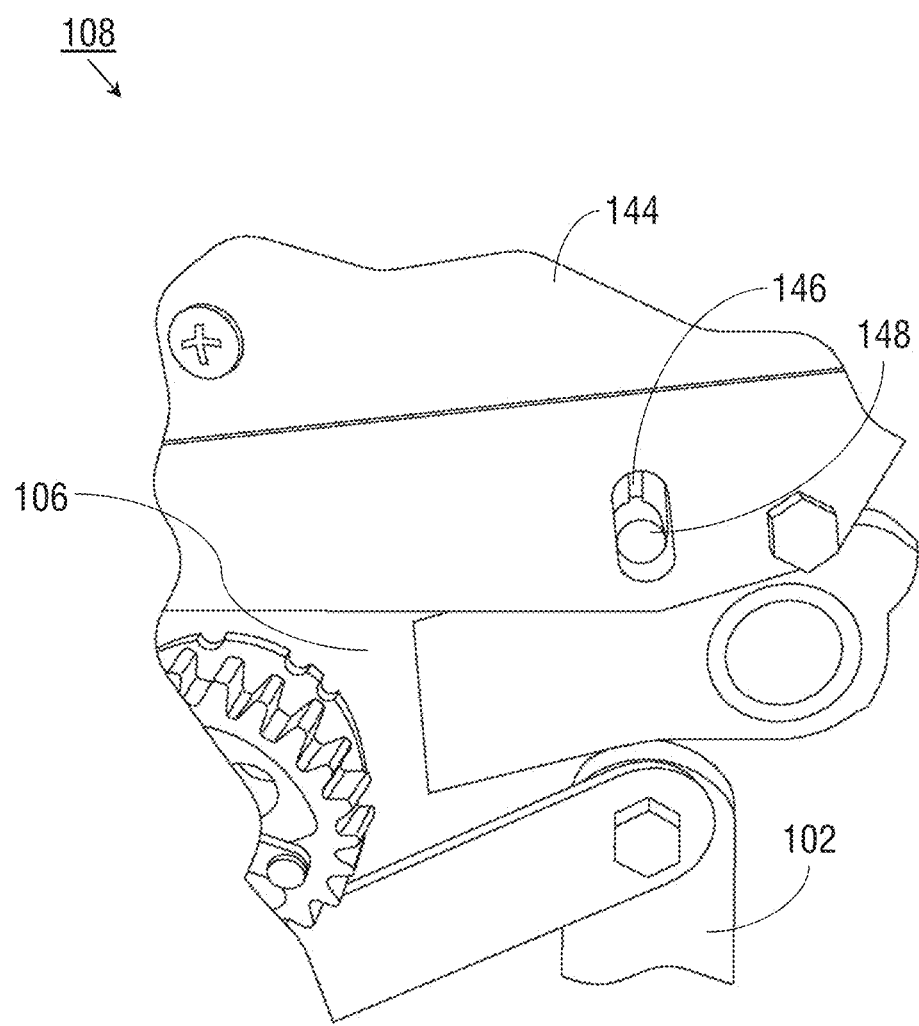
FIG. 3 is a closeup right profile view of a locking mechanism of the slouching divan of FIGS. 2A and 2B.
Figure 4:
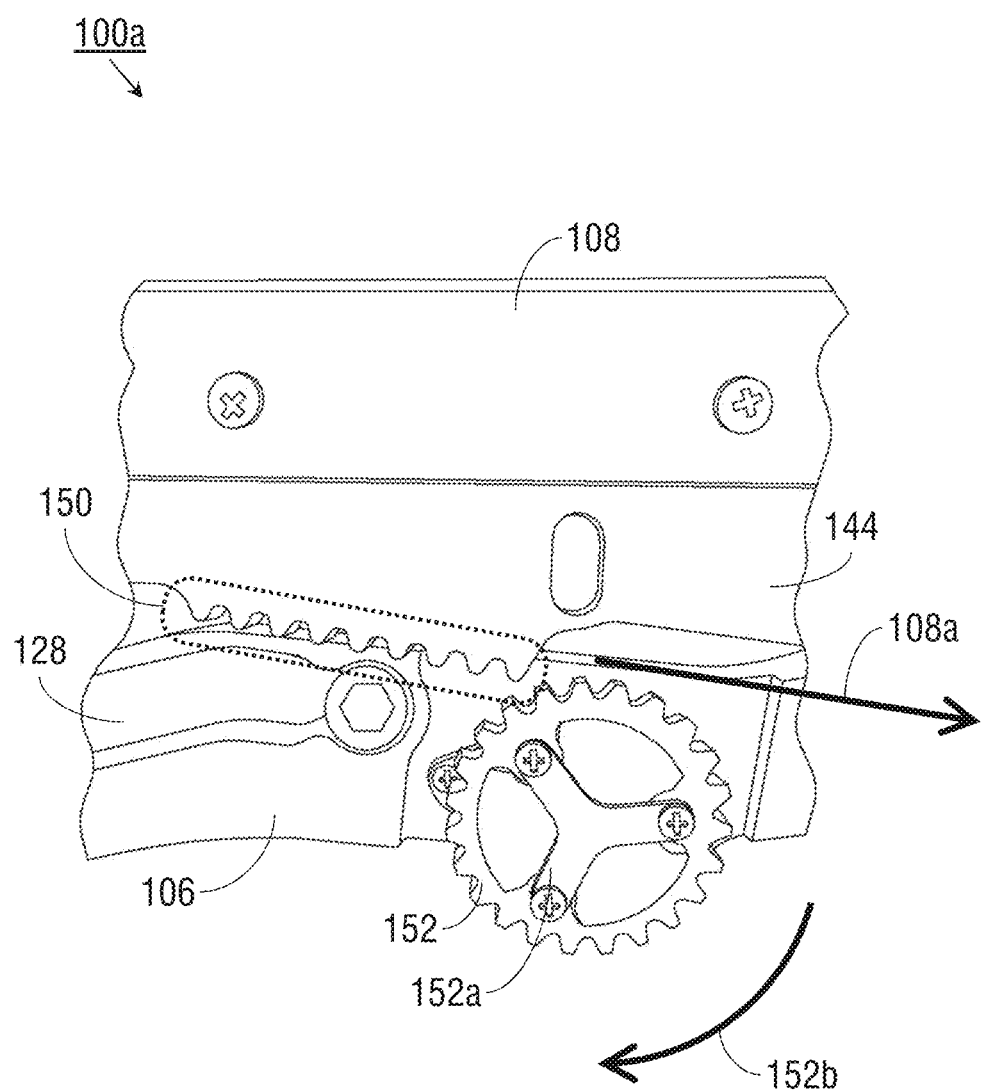
FIG. 4 is a closeup right profile view of a damping device of the slouching divan of FIGS. 2A and 2B.
Figure 5A:
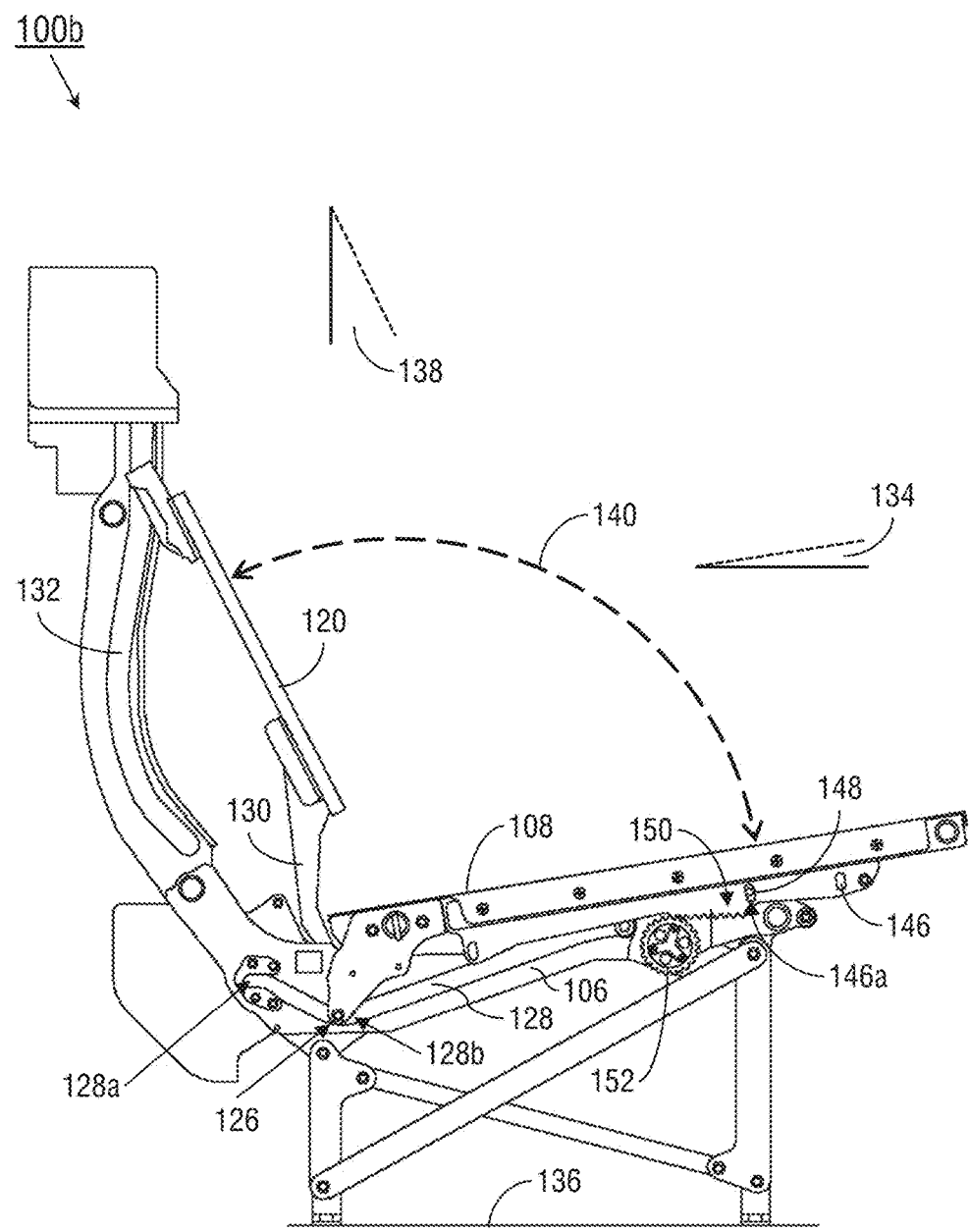
FIGS. 5A and 5B illustrate a right profile view of the slouching divan of FIG. 1 in a slouched configuration.

The seatpan 108 may have, on its left and right sides, a seatpan rail (144) fixed to the seatpan in close proximity to the frame rails 106. Referring also to FIG. 3, each seatpan rail 144 may have an upright locking slot (146) set thereinto which accepts a locking pin (148) for securing the slouching divan 100*a* into the upright configuration. When the slouching divan 100*a* is in the upright configuration, the seatpan roller (126, FIG. 2B) may be disposed at a rear endpoint (128*a*, FIG. 2B) of the lateral roller slots (128, FIG. 2B). The lateral roller slot 128 may track downward from the rear endpoint 128*a* to a midpoint (128*b*, FIG. 2B). When the slouching divan 100*a* is transitioned into the slouching configuration (as shown by FIGS. 5A/B; e.g., by articulation of the seatpan 108 by the occupying passenger after "unlocking" the divan by releasing the left and right locking pins 148 from the upright locking slots 146), the seatpan roller 126 may track forward and down from the rear endpoint 128*a* to the midpoint 128*b* and stop there, the slouched divan 100*a* having achieved the slouched configuration. If the forward-and-down tracking of the seatpan 108 is assisted by gravity and the weight of the occupying passenger, the tracking of the seatpan from the rear endpoint 128*a* to the midpoint 128*b* may be rapid, and the termination of said tracking—i.e., when the seatpan roller 126 reaches the midpoint 128*b*—may be abrupt. From the perspective of the occupying passenger, this process may be uncomfortably jarring; for example, if the passenger is holding a glass, dish, or other container at the time, its contents may be spilled or otherwise upset.

Accordingly, the slouching divan 100*a* may employ a damping system to regulate the rate at which the seatpan 108 tracks from the upright configuration (as shown by FIGS. 2A/B) to the slouched configuration (as shown by FIGS. 5A/B). For example, referring also to FIG. 4, the seatpan rail 144 may further include a set of rack teeth (150) machined along the rail. The frame rail 106 may include a rotary damping device (152) configured to rotate forward (e.g., toward the front of the slouching divan 100*a*, or in the direction in which the divan is oriented to face) at no more than a maximum rate. For example, the rotary damping device 152 may include a set of damping teeth (152*a*) around its circumference, the damping teeth proportioned so as to engage with the rack teeth 150. The rack teeth 150 may be located along the seatpan rail 144 such that when the slouching divan 100*a* is in the upright configuration (as shown by FIGS. 2A/B), the rack teeth are immediately adjacent to the rotary damping device 152 (e.g., toward the rear of the divan). Accordingly, when the seatpan 108 is articulated forward (108*a*) to transition the slouching divan 100*a* from the upright configuration to the slouched configuration (as shown by FIGS. 5A/B), the rack teeth 150 may immediately engage the rotary damping device 152 (in particular, the damping teeth 152*a*). As the rack teeth 150 proceed forward with the seatpan 108, the damping teeth 152*a* engage the rack teeth, rotating forward (152*b*) at no more than the predetermined maximum rate and preventing the seatpan 108 from moving forward any faster than the maximum rate, regulating and smoothing the transition to the slouched configuration. The rotary damping device 152 may be unidirectional, such that while the damping teeth 152*a* engage with the rack teeth 150 and thereby constrain the forward movement of the seatpan 108, the rotary damping device does not impede the rearward motion of the seatpan, e.g., while re-stowing the slouching divan from the slouched configuration to the upright configuration. The slouched divan 100*a* may include any other appropriate rotary or non-rotary means of constraining the forward movement of the seatpan 108 during transition from the upright configuration to the slouched configuration, e.g., linear plunger-type dampers or catch-fork type dampers.

Figure 5B:
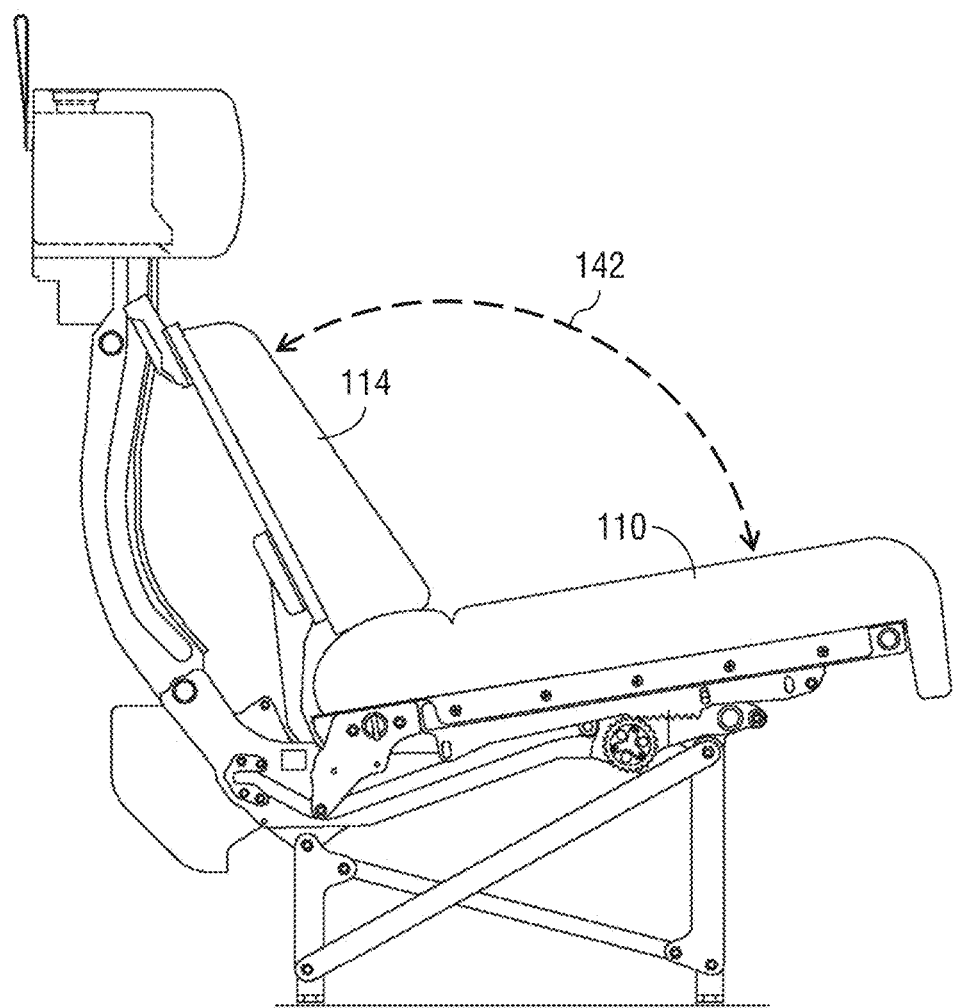

Referring to FIGS. 5A and 5B, the slouched divan 100*b* may be implemented and may function similarly to the slouched divan 100*a* of FIGS. 2A/B, except that the slouched divan 100*b* has fully transitioned into the slouched configuration. For example, the seatpan 108 may track forward from its upright position (as shown by FIGS. 2A/B) as the seatpan roller 126 tracks forward and downward to the midpoint 128*b* in the lateral roller slot 128. As a result, the seatpan angle (134) of the seatpan 108 relative to the aircraft floor (136) and to the horizontal may increase, e.g., the rear end of the seatpan may drop as the seatpan roller 126 tracks forward and downward to the midpoint 128*b* of the lateral roller slot 128. The left and right locking pins 148 may engage with slouch locking slots (146*a*) positioned rearward of the upright locking slots 146, and configured for securing the slouching divan 100*b* in the slouched configuration. In addition, the back follower panel 120, connected to the seatpan 108 by J-connectors 130, may follow the seatpan by tracking downward and rearward along the backrest roller slot 132 to rest at a slightly increased angle to the seatpan 108 and the aircraft floor (136); for example, the backrest angle (138) may range from 24 to 30 degrees to the vertical (e.g., 26.89 degrees, as shown by FIG. 5A). Finally, the rack teeth 150, having engaged the rotary damping device 152, may rest fully outside the rotary damping device, such that no rack teeth remain to engage with the rotary damping device as the seatpan 108 tracks forward from the slouched configuration to the berthed configuration shown by FIGS. 6A/B.

When the slouching divan 100*b* is in the slouched configuration, the included angle 140 between the seatpan 108 and the back follower panel 120 may range from 101 to 111 degrees (e.g., 106.47 degrees as shown by FIG. 5A). Referring also to FIG. 5B, the cushion angle 142 between the seatpan cushion 110 and the backrest cushion 114 may range from 109 to 119 degrees (e.g., 114.02 degrees, as shown by FIG. 5B).

Referring now to FIGS. 6A and 6B, the slouching divan 100*c* may be implemented and may function similarly to the slouching divan 100*b* of FIGS. 5A/B, except that the slouching divan 100*c* has fully transitioned from the slouched configuration shown by FIGS. 5A/B into a berthed configuration (e.g., for passengers wishing to sleep). For example, the seatpan roller 126 may track forward and upward from the midpoint 128*b* of the lateral roller slot 128 to a forward endpoint 128*c*; the seatpan 108 may follow to a maximally forward position. The back follower panel 120, connected to the seatpan 108 by J-connectors 130, may follow the seatpan forward (tracking along the backrest roller slot 132) to a position substantially parallel to the seatpan 108 (and to a horizontal plane parallel to the aircraft floor 136, resulting in a seatpan angle 134 of substantially zero). Once the seatpan 108 has tracked forward to its berthed position, the seatpan may be locked in place by left and right berth locking slots (146*b*) machined into the seatpan rail 144 (e.g., to the rear of the upright locking slots 146 and the slouch locking slots 146*a*) and configured to accommodate the left and right locking pins 148. The slouching divan 100*c* may save weight and complexity by being lockable into one of these three discrete configurations (the berthed configuration or the upright and slouched configurations shown by FIGS. 2A/B and 5A/B) rather than, e.g., an infinite number of possible configurations between the berthed configuration and the upright configuration shown by FIGS. 2A/B. When the slouching divan 100*b* is in the berthed configuration, the backrest angle 138 of the back follower panel 120 to the vertical may range from 80 to 86 degrees, e.g., 82.8 degrees as shown by FIG. 6A. Similarly, the included angle 140 between the back follower panel 120 and the seatpan 108 may range from 167 to 177 degrees (e.g., 172.8 degrees, as shown by FIG. 6A).

Referring also to FIG. 6B, as the seatpan 108 tracks forward, the cross-members 124 may evenly distribute the interface load supported thereby (e.g., among the front legs 102 and rear legs 104). The seatpan cushion 110 may be of a uniform depth, and the depth of the backrest cushion 114 may vary from top to bottom such that when the slouching divan 100*b* is in the berthed configuration, the cushion angle 142 between the seatpan cushion 110 and the backrest cushion 114 is substantially 180 degrees; e.g., the surface of the backrest cushion 114 is substantially coplanar with the surface of the seatpan cushion 110, with both cushions substantially parallel to the aircraft floor (136).

Figure 7A:
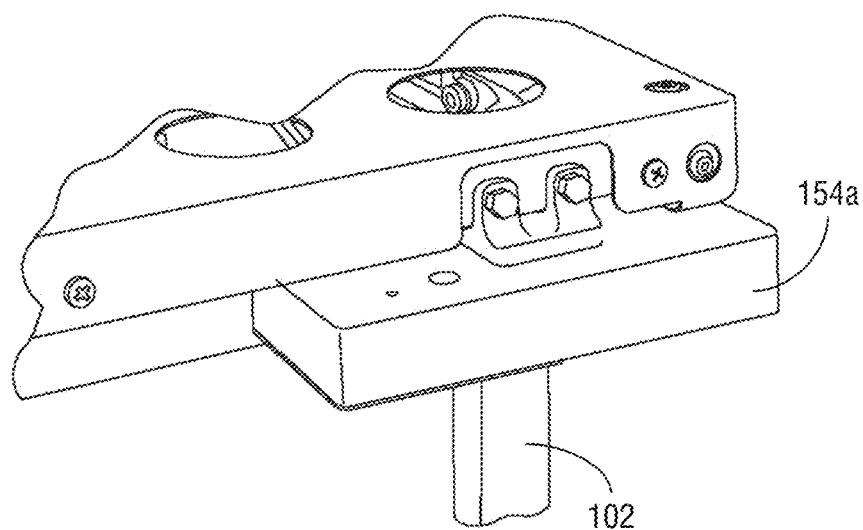
FIG. 7A is a forward perspective view of the mechanical controls of the seatpan of FIGS. 2A and 2B.
Figure 7B:
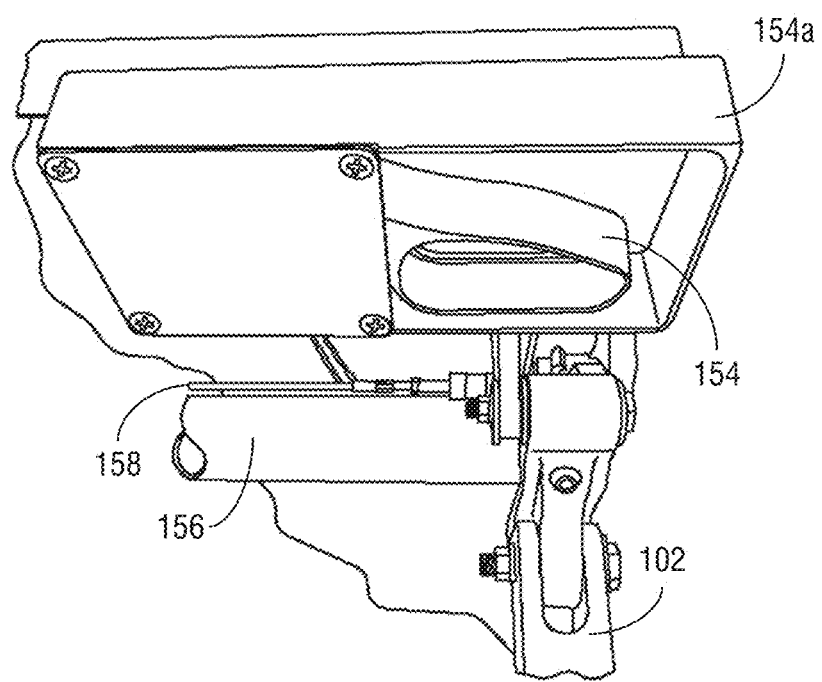
FIGS. 7B and 7C are underside views of the mechanical controls and pin-lock housing of the seatpan of FIG. 7A.
Figure 7C:
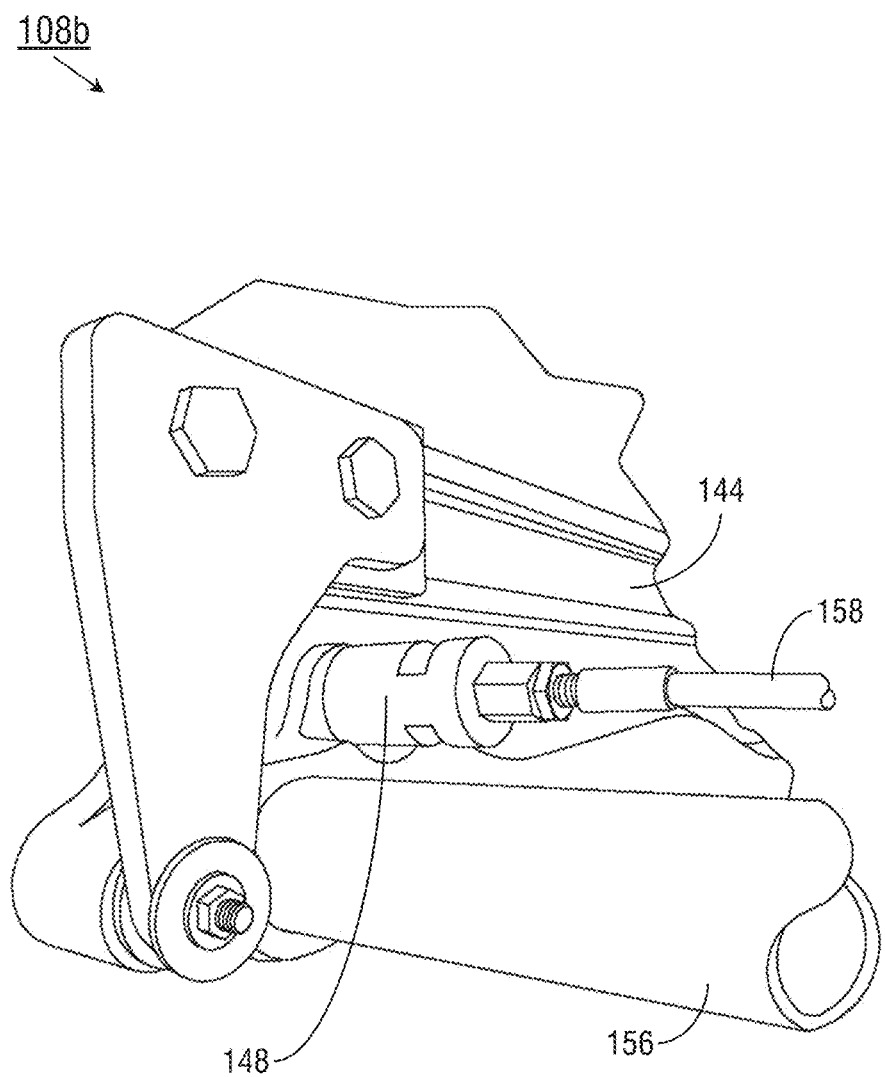

Referring to FIGS. 7A through 7C, the seatpan 108*b* may be implemented and may function similarly to the seatpan 108 of FIGS. 2A/B, except that the seatpan 108*b* may include a handle 154 for unlocking the seatpan 108*b* for transitioning the slouching divan 100*a* (FIGS. 2A/B) from the upright configuration shown by FIGS. 2A/B into the slouched and berthed configurations 100*b*-*c* shown by FIGS. 5A/B and 6A/B respectively. For example, the handle 154 may be mounted to the forward left, or forward outboard, side of the seatpan 108*b* proximate to a front leg 102 and to forward support rails (156) supporting the seatpan 108*b* laterally between left-side and right-side front legs 102. The handle 154 may be partially enclosed in a housing (154*a*) to prevent unintentional unlocking of the seatpan 108*b*. An occupying passenger may grasp the handle 154, pulling the handle forward to disengage the left and right locking pins (148, FIG. 3) from the particular left and right locking slots (146, 146*a*-*b*; FIG. 6B) with which the locking pins are currently engaged (e.g., the upright locking slots 146, FIG. 3) and allowing the seatpan 108*b* to freely track forward from the upright configuration to the slouched configuration and the berthed configuration (or, for example, tracking the seatpan rearward to re-stow a berthed slouching divan (100*c*, FIGS. 6A/B) in the slouched or upright configuration. For example, referring in particular to the underside of the seatpan 108*b* as shown by FIG. 7C the locking pins 148, which engage the locking slots 146, 146*a*-*b* on the left and right sides of the slouching divan 100*a*-*c* (see FIGS. 2A/B, 5A/B, 6A/B), may be disengaged from the locking slots 146 and re-engaged with different locking slots 146*a*-*b* by locking cables 158 controlled by the handle 154 and extending laterally underneath the seatpan 108*b* (e.g., proximate and parallel to the forward support rail 158) to the reverse side of the locking pins 148 on either side of the seatpan 108*b*.

As will be appreciated from the above, a slouching divan according to embodiments of the inventive concepts disclosed herein may provide for optimally comfortable transitions between upright and slouched configurations by regulating the rate of said transitions. Further, the slouching divan saves weight and complexity by being configurable and lockable in three discrete positions rather than an infinite number of possible intermediate positions.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A slouching divan with damped motion, comprising:
at least one front leg and at least one rear leg, the front leg and the rear leg mountable to a floor of an aircraft;
at least one frame rail connecting the front leg and the rear leg, the frame rail including at least one lateral roller slot extending in a downward slope from a rear endpoint associated with an upright configuration to a midpoint associated with a slouched configuration, and extending in an upward slope from the midpoint to a front endpoint associated with a berthed configuration;
at least one seatpan having a front end and a rear end, the seatpan slidably connectable to the lateral roller slot, the seatpan at least partially coverable by a seatpan cushion;
at least one seatpan rail coupled to the seatpan proximate to the lateral roller slot;
at least one backrest having a top, a bottom, and at least one back roller slot extending from the top to the bottom in a rearward curving path;
at least one back follower panel slidably connectable to the back roller slot and coupled to the seatpan proximate the bottom and the rear end by at least one connector, such that the back follower panel follows the movement of the seatpan along the lateral roller slot, the back follower panel at least partially coverable by a backrest cushion; and
at least one unidirectional damping device coupled to the frame rail, the damping device configured to constrain the movement of the seatpan from the upright configuration to the slouched configuration by engaging with the seatpan rail.

2. The slouching divan of claim 1, wherein:
the at least one front leg includes a left front leg and a right front leg;
the at least one rear leg includes a left rear leg and a right rear leg.

3. The slouching divan of claim 1, further comprising:
at least one cross member connecting the left leg and the right leg below the seatpan in a spaced apart relationship.

4. The slouching divan of claim 1, wherein:
the at least one seatpan rail includes a plurality of rack teeth set thereinto; and
the at least one damping device includes a rotary damping device having a plurality of circumferential evenly spaced teeth similarly sized and spaced to the plurality of rack teeth, the rotary damping device configured to constrain the movement of the seatpan by engaging the plurality of rack teeth.

5. The slouching divan of claim 1, wherein the slouching divan includes one of a single-passenger divan, a double-passenger divan, and a triple-passenger divan.

6. The slouching divan of claim 1, wherein:
the at least one lateral roller slot includes at least one of a) a first lateral roller slot machined into the frame rail and b) a second lateral roller slot incorporated into a lateral component attachable to the frame rail; and
the at least one back roller slot includes at least one of a) a first back roller slot machined into the backrest and b) a second back roller slot incorporated into a lateral component attachable to the backrest.

7. The slouching divan of claim 1, wherein:
the at least one seatpan rail includes a left seatpan rail and a right seatpan rail, the left seatpan rail comprising at least one left locking slot configured to accommodate a left locking pin and the right seatpan rail comprising at least one right locking slot configured to accommodate a right locking pin;
the upright configuration associated with a first left locking slot and a first right locking slot;
the slouched configuration associated with a second left locking slot and a second right locking slot; and
the berthed configuration associated with a third left locking slot and a third right locking slot.

8. The slouching divan of claim 7, further comprising:
at least one handle coupled to the front end and configured to disengage the at least one of the left locking pin and the right locking pin from the at least one left locking slot and the at least one right locking slot.

9. The slouching divan of claim 1, wherein the divan is mounted to the interior fixture via the at least one front leg and the at least one rear leg in one of a forward-facing orientation, an aft-facing orientation, and an inboard-facing orientation.

10. The slouching divan of claim 1, wherein the floor includes at least one track set thereinto, the at least one front leg and the at least one rear leg mountable to the at least one track.

11. The slouching divan of claim 10, wherein the at least one front leg and the at least one rear leg are mountable to the at least one track via at least one track fitting removably attachable to the track.

12. The slouching divan of claim 1, wherein:
the seatpan is slidably connectable to the lateral roller slot by at least one seatpan roller capable of lateral tracking within the lateral roller slot.

13. The slouching divan of claim 1, wherein:
the back follower panel is slidably connected to the back roller slot by at least one backrest roller capable of vertical tracking within the back roller slot.

14. The slouching divan of claim 1, further comprising:
at least one crash sensor configured to detect an inertial event associated with the aircraft; and
at least one enhanced restraint coupled to the crash sensor and configured to deploy in response to the detected inertial event.

15. The slouching divan of claim 14, wherein the at least one enhanced restraint includes at least one harness configured to secure a passenger in the divan, the harness comprising:
a first strap coupled to the seatpan and configured to fasten around a waist of the passenger; and
a second strap coupled to the backrest and configured to rest proximate to a shoulder of the passenger;
at least one of the first strap and the second strap including the crash sensor.

16. The slouching divan of claim 15, wherein at least one of the first strap and the second strap includes an airbag coupled to the crash sensor and configured to inflate in response to the detected inertial event.

17. The slouching divan of claim 14, wherein the divan is associated with an inboard-facing orientation, and the enhanced restraint includes:
at least one leg flail prevention device coupled to the crash sensor and attached to one or more of the front leg, the rear leg, and the frame rail.

18. The slouching divan of claim 1, wherein the upright configuration is defined by:
a seatpan angle between the seatpan and the floor of between 3 and 8 degrees;
a backrest angle between the back follower panel and a vertical of between 13 and 18 degrees;

an included angle between the back follower panel and the seatpan of between 95 and 105 degrees; and a cushion angle between the backrest cushion and the seatpan cushion of between 104 and 114 degrees.

19. The slouching divan of claim 18, wherein the slouched configuration is defined by:

the seatpan angle of between 8 and 14 degrees;
the backrest angle of between 24 and 29 degrees;
the included angle of between 101 and 111 degrees and
the cushion angle of between 109 and 119 degrees.

20. The slouching divan of claim 18, wherein the berthed configuration is defined by:

the seatpan angle of zero degrees;
the backrest angle of between 80 and 86 degrees;
the included angle of between 167 and 177 degrees; and
the cushion angle of 180 degrees.

* * * * *